United States Patent
Aussiker

(10) Patent No.: US 6,644,601 B2
(45) Date of Patent: Nov. 11, 2003

(54) CABLE TRAY STAND

(75) Inventor: Glen Alan Aussiker, Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,767

(22) Filed: Oct. 16, 2001

(65) Prior Publication Data

US 2003/0071177 A1 Apr. 17, 2003

(51) Int. Cl.[7] .................................................. F16L 3/00
(52) U.S. Cl. ........................ 248/49; 248/161; 248/170; 248/125.8; 248/354.5
(58) Field of Search .......................... 248/125.2, 125.1, 248/125.3, 125.8, 354.1, 354.4, 354.5, 49, 161, 166, 170

(56) References Cited

U.S. PATENT DOCUMENTS

| | | | | |
|---|---|---|---|---|
| 496,739 A | * | 5/1893 | Kennedy | 108/147.21 |
| 2,472,654 A | * | 6/1949 | Engelke | 248/49 |
| 2,684,222 A | * | 7/1954 | Miller | 248/49 |
| 3,313,505 A | * | 4/1967 | Petrie | 211/191 |
| 3,809,348 A | * | 5/1974 | Di Laura | 248/49 |
| 4,161,302 A | * | 7/1979 | Stuhlman | 248/49 |
| 5,310,153 A | * | 5/1994 | Jackson | 248/354.5 |
| 5,316,244 A | * | 5/1994 | Zetena, Jr. | 248/49 |
| 5,477,649 A | * | 12/1995 | Bessert | 174/48 |
| 5,516,069 A | * | 5/1996 | Hanna | 248/354.1 |
| 5,520,360 A | * | 5/1996 | Wensman | 248/188.5 |
| 5,752,679 A | | 5/1998 | Thomason | |
| 5,758,854 A | * | 6/1998 | Shih | 248/354.3 |
| 5,876,011 A | * | 3/1999 | Blasing | 248/170 |
| 5,901,935 A | * | 5/1999 | Lai | 248/354.1 |
| 6,019,337 A | * | 2/2000 | Brown | 248/352 |
| 6,061,884 A | | 5/2000 | Ohms et al. | |
| 6,076,778 A | * | 6/2000 | Brown | 248/49 |
| 6,102,344 A | * | 8/2000 | Kasvin et al. | 248/118 |
| 6,206,613 B1 | * | 3/2001 | Elkins | 405/157 |
| 6,347,493 B1 | * | 2/2002 | Jette | 248/49 |

* cited by examiner

Primary Examiner—Korie Chan
(74) Attorney, Agent, or Firm—Hunton & Williams LLP

(57) ABSTRACT

A cable tray stand for supporting a cable tray is provided. The cable tray is for supporting at least one cable. The cable tray stand has a height adjustable first member, a support member attached to an upper end of the first member, and a base attached to a lower end of the first member. The support member is adapted to support the cable tray such that the cable tray is supported at a second vertical position above a first vertical position at which the base is located, and the first member is collapsible to a transport height.

26 Claims, 4 Drawing Sheets

US 6,644,601 B2

CABLE TRAY STAND

BACKGROUND OF THE INVENTION

Embodiments of the invention relate to support stands. More particularly, embodiments of the invention relate to support stands for cables.

Many industrial locations have a need for movable, stable support stands for cables and other conduits. Currently, cables are often routed by attaching the cables to available structures such as buildings or existing equipment.

SUMMARY OF THE INVENTION

The invention provides, among other things, solutions to problems associated with cable routing.

Examples of the invention include a cable tray stand for supporting a cable tray that supports at least one cable. The cable tray stand has a height adjustable first member, a support member attached to an upper end of the first member, and a base attached to a lower end of the first member. The support member is adapted to support the cable tray such that the cable tray is supported at a second vertical position above a first vertical position at which the base is located, and the first member is collapsible to a transport height.

Other examples of the invention include a cable tray system for supporting at least one cable. The cable tray system has a cable tray, and at least one cable tray stand. Each cable tray stand has a height adjustable first member, a support member attached to an upper end of the first member, and a base attached to a lower end of the first member. The support member supports the cable tray such that the cable tray is supported at a second vertical position above a first vertical position at which the base is located, and the first member is collapsible to a transport height.

Other examples of the invention include a cable stand for supporting at least one cable. The cable stand has a height adjustable first member, a support member attached to an upper end of the first member, and a base attached to a lower end of the first member. The support member is adapted to support the at least one cable such that the at least one cable is supported at a second vertical position above a first vertical position at which the base is located, and the first member is collapsible to a transport height.

Other examples of the invention include a method of supporting at least one cable. The method includes providing a cable tray, providing at least one cable tray stand, and supporting the at least one cable by laying it in the cable tray. The at least one cable tray stand has a height adjustable first member, a support member attached to an upper end of the first member, and a base attached to a lower end of the first member. The support member supports the cable tray such that the cable tray is supported at a second vertical position above a first vertical position at which the base is located, and the first member is collapsible to a transport height.

These and other features of the invention will be readily apparent to those skilled in the art upon reading this disclosure in connection with the attached drawing figures.

DETAILED OF THE INVENTION

The invention provides a solution to the problem of providing movable, stable support for cables. Embodiments of the invention solve this problem by providing a cable tray stand for supporting a cable or a cable tray that, in turn, supports the cable.

Routing cables by attaching them to available structures such as buildings or existing equipment can result in introduction of heat and stray electro-mechanical interference, can require additional cable as a result of an indirect routing path, and can pose a safety hazard due to low hanging cables. One method of supporting such cables uses a standard two-inch by four-inch piece of lumber with a notch at the top. This type of design cannot support more than a few cables and cannot be disassembled for portability.

The invention provides a means to safely route overhead cables in a situation where they are not permanently installed in mounted conduit. The invention provides a means of routing data cables away from exposure to electro-mechanical interference and heat. The invention provides a means of routing electrical power cords overhead instead of on the ground posing a trip hazard.

Figure 1:
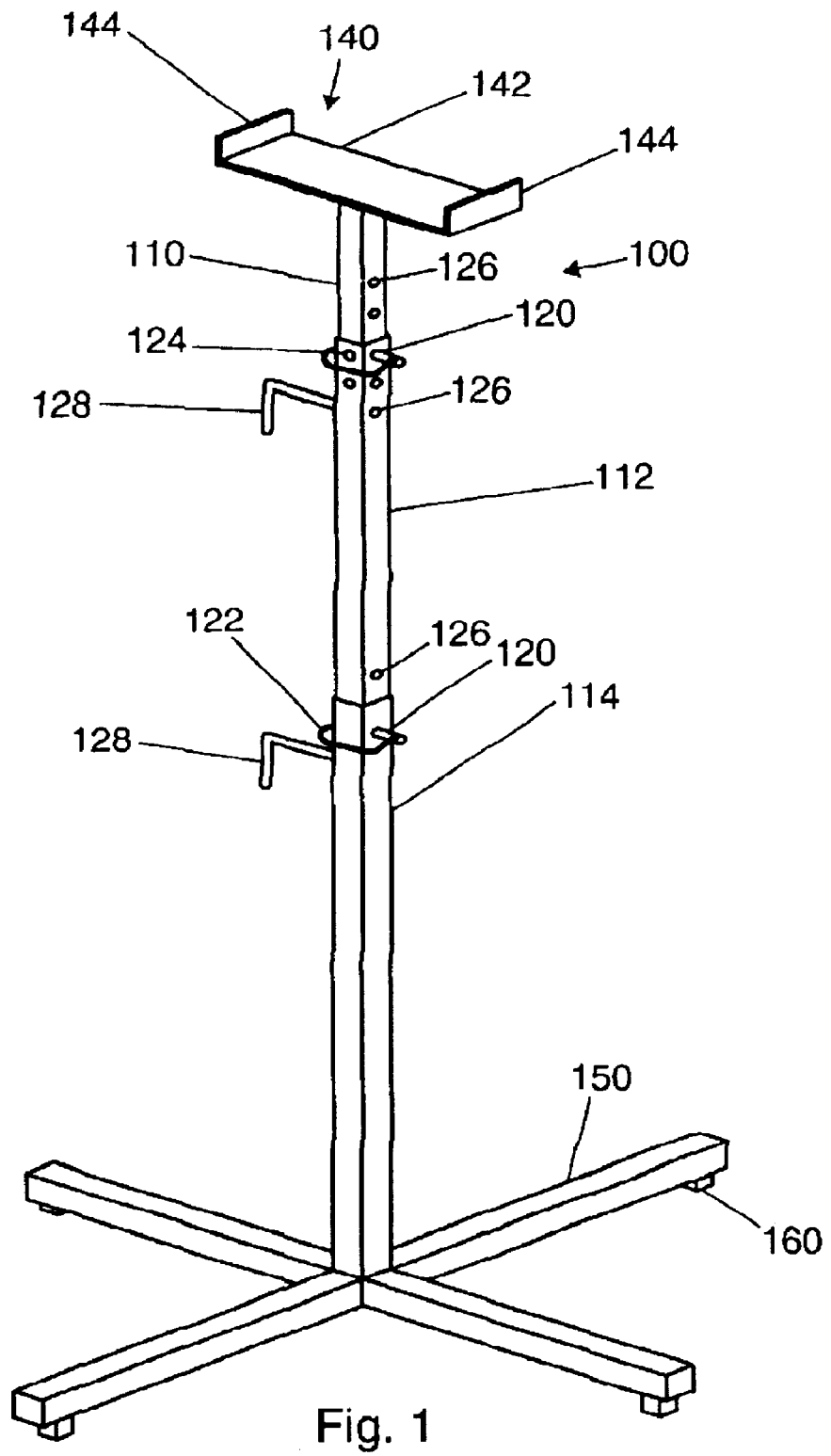
FIG. 1 is a perspective view of an example of a cable tray stand in accordance with the invention.

FIG. 1 shows an example of a cable stand 100 in accordance with the invention. Cable stand 100 has a substantially vertical height adjustable member made up of three telescoping sections. A first section 110 of the height adjustable member slides within a second section 112 of the height adjustable member which, in turn, slides within a third section 114 of the height adjustable member. Although this example shows the height adjustable member having three sections, it is noted that any appropriate number of sections can be used. Increasing the number of sections of the height adjustable member can increase the height range over which the cable stand can be adjusted, but can result in increased weight and increased production costs. Using a height adjustable member having fewer sections can result in a lighter and less expensive structure, but can also result in a more limited range of adjustment. In addition, having fewer sections in the height adjustable member can result in a taller minimum height of the height adjustable member which adversely affects the minimum overall dimensions attainable for shipping or movement. While the height adjustable member can be fabricated from any material that is strong enough and rigid enough to support the anticipated cable load, one example of an appropriate material is 11 gauge steel tubing. The lower most section of the height adjustable member, in this example, third section 114, is attached to a base 150 having feet 160. Feet 160 can be adjustable to assist in leveling stand 100. In this example, base 150 has four legs to provide a stable foundation for cable stand 100. However, any appropriate number of legs or any appropriate configuration can be used. For example, a round or rectangular base can be used in lieu of a number of legs. The sections of the height adjustable member can be moved relative to one another to provide the required height for any particular application. Height holes 124, 126 are formed in sections 110, 112, 114 of the height adjustable member to allow the placement of pins 120 to fix the relative positions of sections 110, 112, 114. Safety clasps 122 are used to prevent pins 120 from inadvertently being dislodged from height holes 124, 126. By providing height holes 124 on a different side of second section 112 than height holes 126, the rotational position of first section 110 can be changed relative to that of second section 112. Bolts 128 are also provided to further secure sections 110, 112, 114 of the height adjustable member relative to one another.

FIG. 1 shows cable stand 100 having a support member 140 attached to first section 110 of the height adjustable member. In this example, support member 140 has a horizontal portion 142 and two opposing side portions 144, i.e., which may be two vertical portions 144. Support member 140 provides support for cables or support for a cable tray that, in turn, supports cables. The side portions 144 are disposed outside of opposing sides of the cable tray 300, as shown in FIG. 3, for example.

Figure 2:
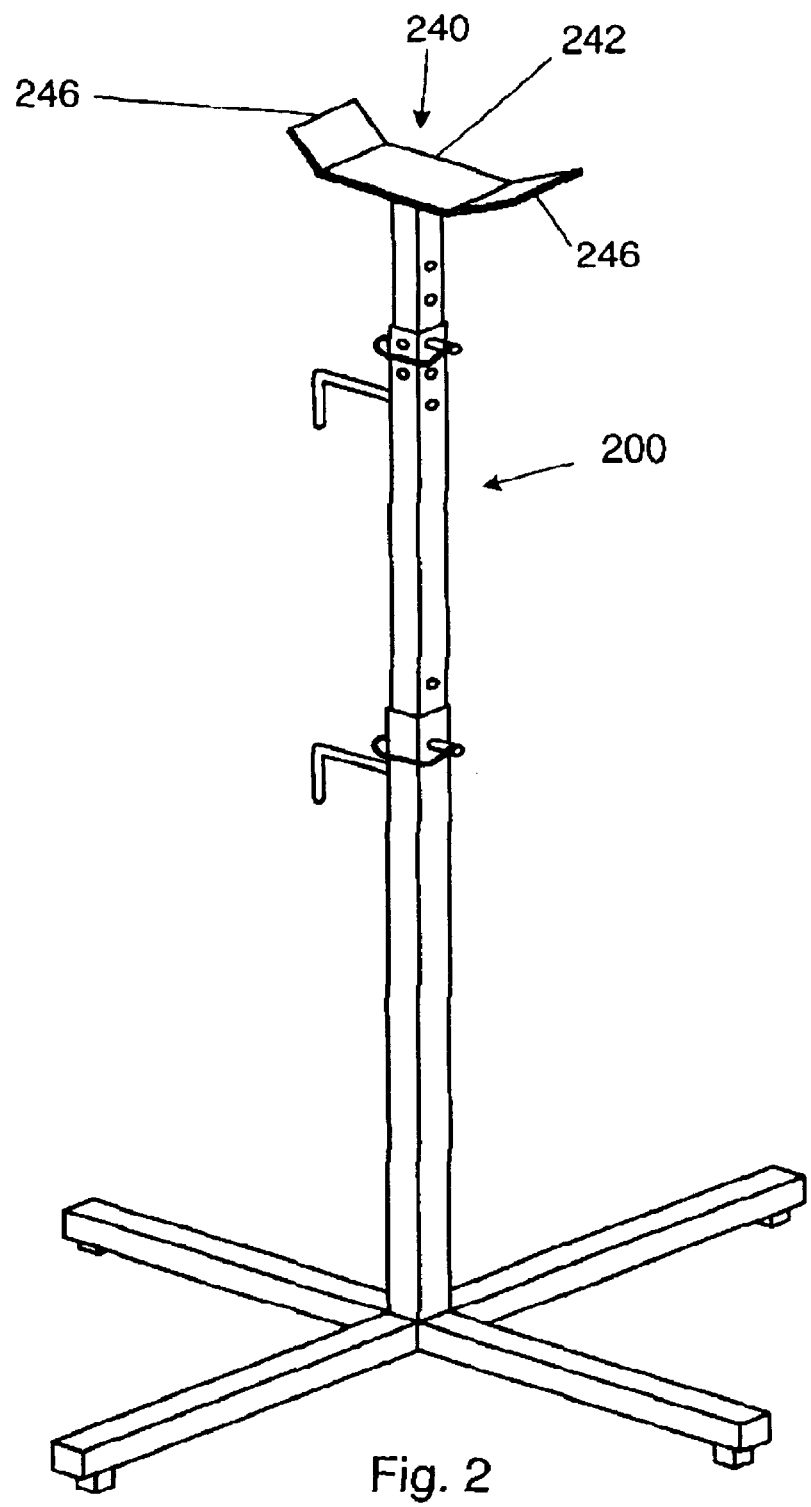
FIG. 2 is a perspective view of another example of a cable tray stand in accordance with the invention.

FIG. 2 shows an example of a cable stand 200 in accordance with the invention. Cable stand 200 is similar to cable stand 100 shown in FIG. 1 except that support member 240 is used instead of support member 140. Support member 240 has a horizontal portion 242 and two angled portions 246. The angled shape of support member 240 can be more appropriate for particular cable support applications in that angled portions 246 are attached to horizontal portion 242 at angles greater than 90°, thus eliminating the right angles of support member 140.

Figure 3:
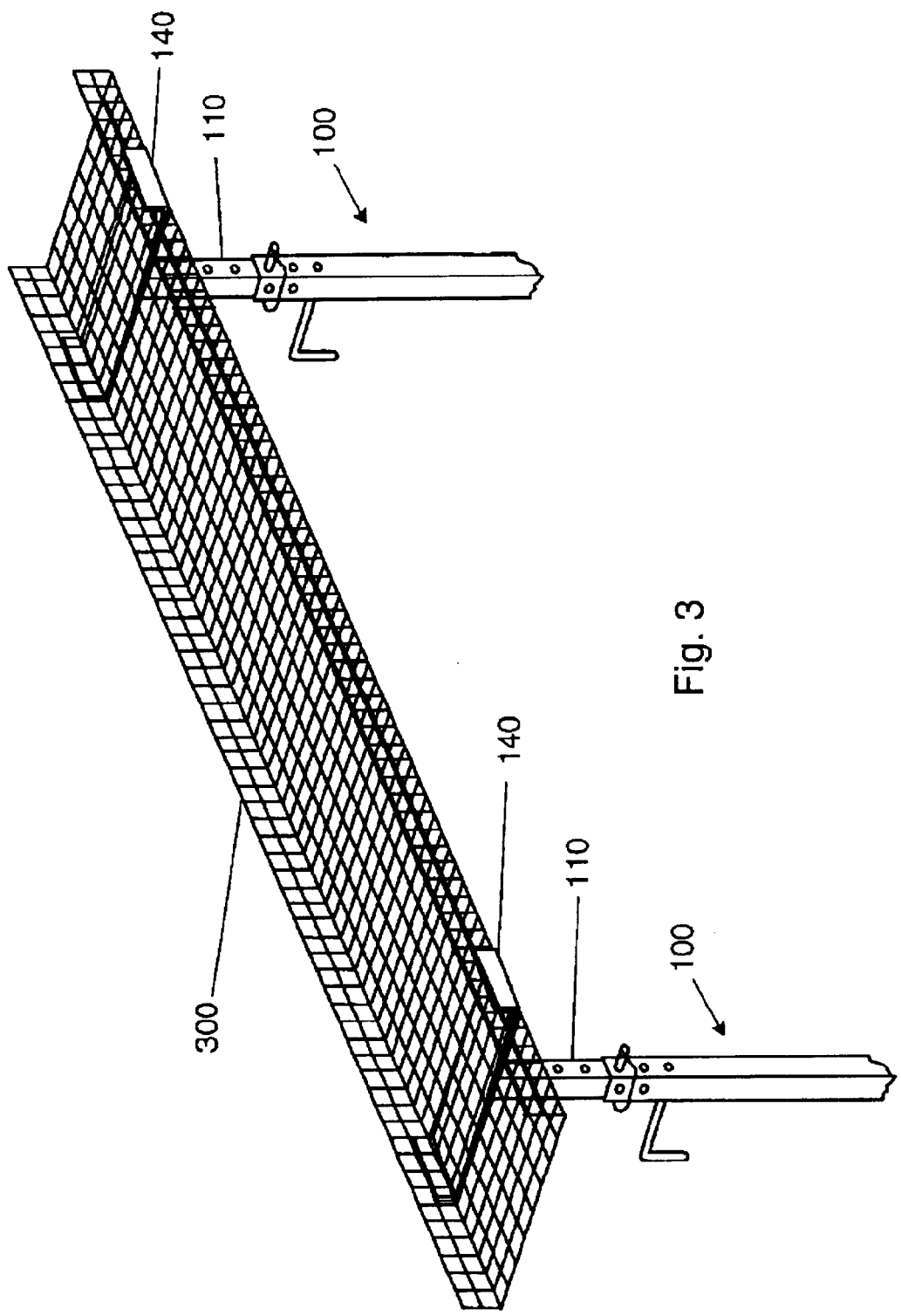
FIG. 3 is a perspective view of a cable tray and two cable tray support stands in accordance with the invention.

FIG. 3 shows two cable stands 100 used to support a cable tray 300. An embodiment of the invention similar to that shown in FIG. 3 can be preferable to the use of a single cable stand 100 in, for example, applications where the cable being supported is more flexible and therefore requires a shorter distance between supports. Although the cable tray 300 shown in FIG. 3 is straight, it is noted that a curved or angled cable tray can also be used. Further, more or less than two cable stands 100 can be used to support cable tray 300.

Figure 4:
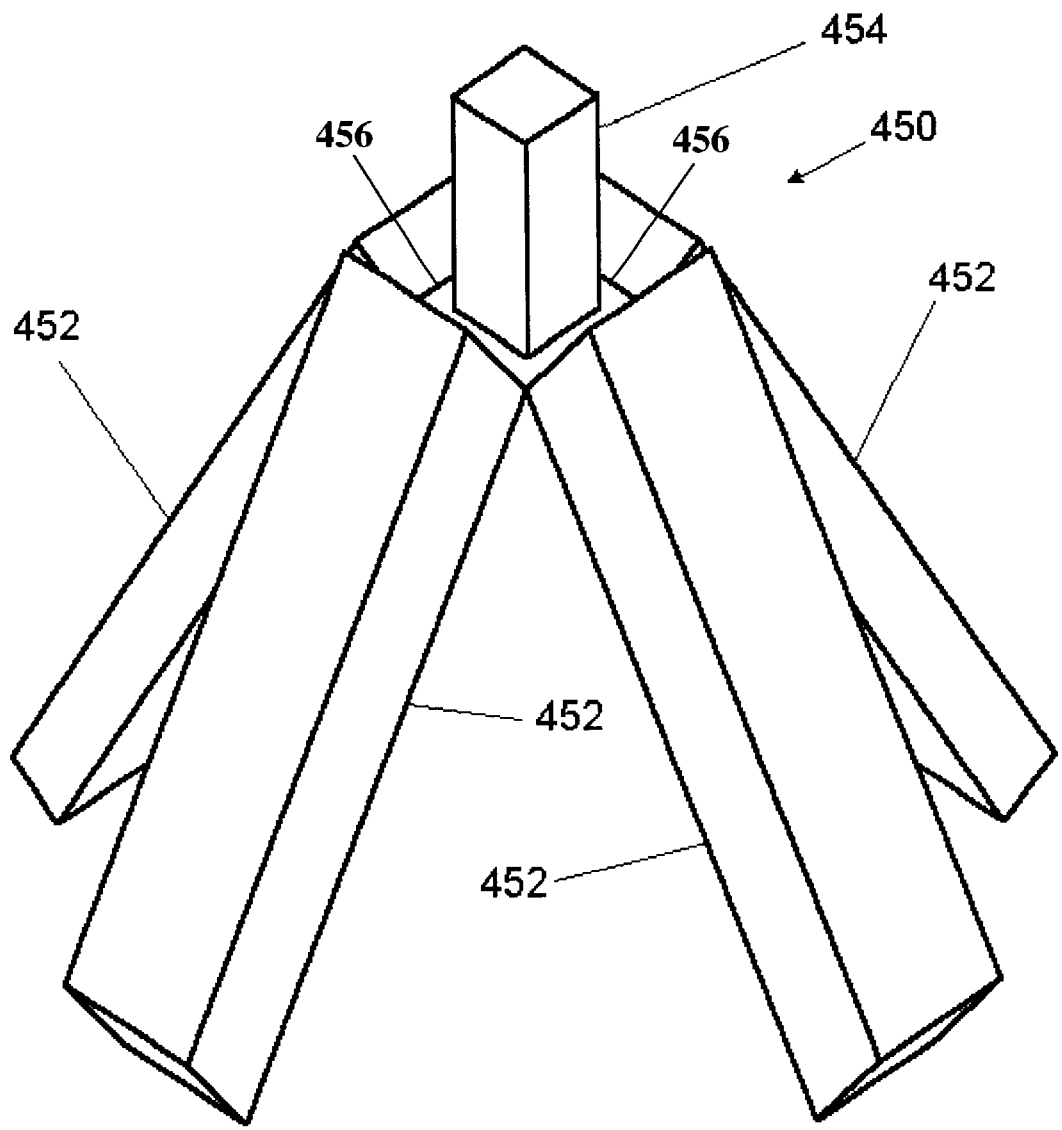
FIG. 4 is a partial view of a foldable base in accordance with the invention.

FIG. 4 shows an example of a base 450 for cable stand 100, 200. In this example, base 450 is collapsible in order to provide a smaller overall dimension for shipping or movement from one location to another. Post 454 is connected to third section 114 of the height adjustable member. This connection can be a friction fit between post 454 and third section 114, or some other means of connection. Legs 452 are, in this example, hinged relative to post 454 so that they can be folded down for shipping or movement, but are unable to move vertically beyond the point at which base 450 provides stable support for the cable stand. Other forms of collapsible bases such as, for example, multi-folding legs and telescoping legs, can also be used as long as sufficient support is provided for the cable stand.

While the invention has been described with reference to particular embodiments and examples, those skilled in the art will appreciate that various modifications may be made thereto without significantly departing from the spirit and scope of the invention.

What is claimed is:

1. A cable tray stand in combination with a cable tray, the cable tray stand for supporting a cable tray, the cable tray for supporting at least one cable, the cable tray being constructed of wire mesh, the cable tray stand comprising:
   a height adjustable member;
   a support member attached to an upper end of the height adjustable member, the support member being U-shaped so as to have a horizontal portion and opposing two side portions attached to the horizontal portion, the side portions disposed outside of opposing sides of the cable tray; and
   a base attached to a lower end of the height adjustable member,
   wherein, the support member is adapted to support the cable tray such that the cable tray is supported at a second vertical position above a first vertical position at which the base is located, and
   the height adjustable member is collapsible to a transport height; and
   wherein the base further comprises a plurality of collapsible portions that can be moved into transport positions, the base being more compact in the transport position.

2. The stand of claim 1, wherein the transport height is approximately one-third a maximum support height.

3. The stand of claim 1, wherein the plurality of collapsible portions includes a plurality of legs that are hinged to a post, the post connected to the height adjustable member.

4. The stand of claim 1, wherein the height adjustable member further comprises a plurality of height locators, the height locators enabling the height adjustable member to be fixed at a plurality of different heights.

5. The stand of claim 1, wherein the height adjustable member further comprises a plurality of telescoping sections.

6. The stand of claim 5, wherein the telescoping sections telescope along a common axis.

7. The stand of claim 6, wherein the height adjustable member further comprises a plurality of height locators, the height locators enabling the height adjustable member to be fixed at a plurality of different heights.

8. A cable tray system for supporting at least one cable, the cable tray system comprising:
   a cable tray; and
   at least one cable tray stand, the at least one cable tray stand having
      a height adjustable member;
      a support member attached to an upper end of the height adjustable member; and
      a base attached to a lower end of the height adjustable member,
      wherein, the support member supports the cable tray such that the cable tray is supported at a second vertical position above a first vertical position at which the base is located, and
      the height adjustable member is collapsible to a transport height; and
   wherein the cable tray is U-shaped in cross section and is wire mesh; and
   the support member being U-shaped so as to have a horizontal portion and opposing two side portions attached to the horizontal portion, the side portions of the support member disposed outside of opposing sides of the cable tray; and
   wherein the base further comprises a plurality of collapsible portions that can be moved into transport positions, the base being more compact in the transport position.

9. The system of claim 8, wherein the transport height is approximately one-third a maximum support height.

10. The system of claim 8, wherein the height adjustable member further comprises a plurality of height locators, the height locators enabling the height adjustable member to be fixed at a plurality of different heights.

11. The system of claim 8, wherein the height adjustable member further comprises a plurality of telescoping sections.

12. The system of claim 11, wherein the telescoping sections telescope along a common axis.

13. A cable tray system for supporting at least one cable, the cable tray system comprising:

a cable tray; and at least one cable tray stand, the at least one cable tray stand having
- a height adjustable member;
- a support member attached to an upper end of the height adjustable member; and
- a base attached to a lower end of the height adjustable member,
- wherein, the support member supports the cable tray such that the cable tray is supported at a second vertical position above a first vertical position at which the base is located, and
- the height adjustable member is collapsible to a transport height; and wherein the cable tray is U-shaped in cross section and is wire mesh; and the support member being U-shaped so as to have a horizontal portion and opposing two side portions attached to the horizontal portion, the side portions of the support member disposed outside of opposing sides of the cable tray; and wherein the height adjustable member further comprises a plurality of telescoping sections;

wherein the telescoping sections telescope along a common axis; and wherein the height adjustable member further comprises a plurality of height locators, the height locators enabling the height adjustable member to be fixed at a plurality of different heights,
- the base further comprises a plurality of collapsible portions that can be moved into transport positions, the base being more compact in the transport position.

14. A cable stand, in combination with a cable tray, for supporting at least one cable, the cable tray being U-shaped in cross section and constructed of wire mesh, the cable stand comprising:
- a height adjustable member;
- a support member attached to an upper end of the height adjustable member, the support member being U-shaped so as to have a horizontal portion and opposing two side portions attached to the horizontal portion, the side portions disposed outside of opposing sides of the cable tray; and
- a base attached to a lower end of the height adjustable member,
- wherein, the support member is adapted to support the at least one cable such that the at least one cable is supported at a second vertical position above a first vertical position at which the base is located, and
- the height adjustable member is collapsible to a transport height; and
- wherein the base further comprises a plurality of collapsible portions that can be moved into transport positions, the base being more compact in the transport position; and
- wherein the cable tray being U-shaped in cross section includes a horizontal cable tray portion and two cable tray side portions extending upwardly from opposing sides of the horizontal cable tray portion, the horizontal portion or the support member disposed against rind in parallel with the horizontal cable tray portion, and each side portion of the support member disposed against and in parallel with a corresponding one of the cable tray side portions.

15. The stand of claim 14, wherein the transport height is approximately one-third a maximum support height.

16. The stand of claim 14, wherein the plurality of collapsible portions includes a plurality of legs that are hinged to a post, the post connected to the height adjustable member.

17. The stand of claim 14, wherein the height adjustable member further comprises a plurality of height locators, the height locators enabling the height adjustable member to be fixed at a plurality of different heights.

18. The stand of claim 14, wherein the height adjustable member further comprises a plurality of telescoping sections.

19. The stand of claim 18, wherein the telescoping sections telescope along a common axis.

20. The stand of claim 19, wherein the height adjustable member further comprises a plurality of height locators, the height locators enabling the height adjustable member to be fixed at a plurality of different heights.

21. A method of supporting at least one cable, the method comprising:
- providing a cable tray, the cable tray being U-shaped in cross section and constructed of wire mesh;
- providing at least one cable tray stand, the at least one cable tray stand having
  - a height adjustable member;
  - a support member attached to an upper end of the height adjustable member, the support member being U-shaped so as to have a horizontal portion and opposing two side portions attached to the horizontal portion, the side portions disposed outside of opposing sides of the cable tray; and
  - a base attached to a lower end of the height adjustable member,
  - wherein, the support member supports the cable tray such that the cable tray is supported at a second vertical position above a first vertical position at which the base is located, and
  - the height adjustable member is collapsible to a transport height; and
- supporting the at least one cable by laying it in the cable tray; and
- wherein the base further comprises a plurality of collapsible portions that can be moved into transport positions, the base being more compact in the transport position.

22. The method of claim 21, wherein the transport height is approximately one-third a maximum support height.

23. The method of claim 21, wherein the height adjustable member further comprises a plurality of height locators, the height locators enabling the height adjustable member to be fixed at a plurality of different heights.

24. The method of claim 23, wherein the height adjustable member further comprises a plurality of telescoping sections.

25. The method of claim 24, wherein the telescoping sections telescope along a common axis.

26. A method of supporting at least one cable, the method comprising:
- providing a cable tray, the cable tray being U-shaped in cross section and constructed of wire mesh;
- providing at least one cable tray stand, the at least one cable tray stand having
  - a height adjustable member;

a support member attached to an upper end of the height adjustable member, the support member being U-shaped so as to have a horizontal portion and opposing two side portions attached to the horizontal portion, the side portions disposed outside of opposing sides of the cable tray; and a base attached to a lower end of the height adjustable member, wherein, the support member supports the cable tray such that the cable tray is supported at a second vertical position above a first vertical position at which the base is located, and the height adjustable member is collapsible to a transport height; and supporting the at least one cable by laying it in the cable tray; and wherein the height adjustable member further comprises a plurality of height locators, the height locators enabling the height adjustable member to be fixed at a plurality of different heights;

wherein the height adjustable member further comprises a plurality of telescoping sections;

wherein the telescoping sections telescope along a common axis; and the base further comprises a plurality of collapsible portions that can be moved into transport positions, the base being more compact in the transport position.

* * * * *